United States Patent Office 3,394,194
Patented July 23, 1968

3,394,194
PROCESS FOR THE PRODUCTION OF
1,4-NAPHTHALENEDIOL
Charles J. Lind, Hamburg, and Allen W. Sogn, Williamsville, N.Y., assignors to Allied Chemical Corporation, New York, N.Y., a corporation of New York
No Drawing. Filed Nov. 19, 1965, Ser. No. 508,849
7 Claims. (Cl. 260—621)

ABSTRACT OF THE DISCLOSURE

The compound 1,4-naphthalenediol is prepared by heating 4-amino-1-naphthol in the presence of an aqueous acid at a temperature of at least 80° C.

---

1,4-naphthalenediol is useful as a chemical intermediate, and is particularly useful as an intermediate in the manufacture of dyestuffs. For example, it can be converted into 4-methoxy-1-naphthol, which is required in the production of commercial dyestuffs such as those disclosed in U.S. Patent 3,163,634.

Traditionally, 1,4-naphthalenediol has been obtained by reduction of 1,4-naphthoquinone which was amply and reliably obtainable as a by-product from the manufacture of phthalic anhydride by the catalytic oxidation of naphthalene. However, with the advent of improved technology in the manufacture of phthalic anhydride, the supply of 1,4-naphthoquinone has become increasingly scarce; so that this source can no longer be considered ample and reliable.

Accordingly, an object of this invention is to provide a process for the manufacture of 1,4-naphthalenediol which is independent of 1,4-naphthoquinone.

Another object is to provide an efficient process for producing 1,4-naphthalenediol directly from a readily available material.

According to the present invention, we have now discovered that 1,4-naphthalenediol can be directly produced in excellent quality and yield by heating 4-amino-1-naphthol in the presence of an aqueous acid at a temperature of at least about 80° C.

This is unexpected since, although it was known that 1,4-naphthalenediol could be formed by the alkaline decomposition of the sodium bisulfite addition product of 4-amino-1-naphthol, and from α-naphthylhydroxylamine by boiling with dilute sulfuric acid, the direct conversion of 4-amino-1-naphthol to 1,4-naphthalenediol had heretofore not been achieved. In studying the latter reaction, it was reported that 4-amino-1-naphthol was found as a by-product, but attempts to hydrolyze it to 1,4-naphthalenediol were unsuccessful. (J. Pajak Rocznicki Chem. 16 (1936), 551–9). Accordingly, it was believed that such a hydrolytic procedure was not possible.

The process of this invention should be carried out for a period of time sufficient to permit substantial conversion of 4-amino-1-naphthol to 1,4-napthalenediol. Normally a reaction time of at least about 4 hours is required to obtain satisfactory yields. Prolonged reaction times, i.e. above about 4 hours, results in decomposition of the product. Particularly advantageous results have been obtained with reaction times of 13 to 18 hours.

While tempertaures of at least about 80° C. up to about 150° C. or higher are suitable for carrying out the process of this invention, those of about the reflux temperature of the aqueous acid medium are preferred.

Acids suitable for use as the aqueous acid of this invention are those which are water-miscible and include such organic and inorganic acids as sulfuric, phosphoric, hydrochloric, hydrobromic and formic, as well as their acid-acting salts where they exist. Sulfuric acid is preferred. Such acids can be used solely or in a combination. Sulfuric acid can be used in aqueous concentrations of up to about 50%, but it is preferable to use concentrations of about 10 to 20%.

In carrying out the process of this invention the acid salt of 4-amino-1-naphthol can be admixed with the aqueous acid, or 4-amino-1-naphthol may be admixed with the aqueous acid to form the acid salt in situ. However, because the free amine form darkens on exposure to the atmosphere, 4-amino-1-naphthol is commonly available in the form of an acid salt, particularly in the form of the sulfate and hydrochloride salts.

Suitable ratios of equivalents of acid to the amino compound are from about 1:1 to 16:1, preferably from about 4:1 to 8:1.

1,4-naphthalenediol produced by the process of this invention is readily recovered and purified by cooling the reaction mixture to room temperature or a lower temperature, separating the 1,4-naphthalenediol, e.g. by filtration, then washing with cold water, and drying.

Although the process of this invention can be carried out at superatmospheric pressures, we prefer, and it is more economical, to operate at atmospheric pressure. It is advantageous to exclude air during the processing of the product, thereby minimizing oxidation. Thus, a lighter colored and higher melting product is obtained when the product is dried in a vacuum oven than when dried atmospherically.

The examples given below illustrate the process of the present invention. In the reactions given in the examples, completion of reaction was determined by the following color test for 4-amino-1-naphthol: A few drops of the reaction mixture were placed on bibulous paper and the wetted area was contacted with diazotized p-nitro-aniline solution. If, upon washing the spot with acetone, a deep purple stain remained, 4-amino-1-naphthol was present and the reaction was therefore not complete. A bright, scarlet stain indicated the absence of the amino compound and consequently completion of the hydrolysis reaction. In the examples percentages are by weight.

Example I

A 15% solution of sulfuric acid was prepared by adding 260 grams (2.65 moles) of 100% sulfuric acid to 1475 grams of water. To the acid solution 173.5 grams (0.887 mole) of 4-amino-1-naphthol hydrochloride was added with agitation. The slurry was then agitated and heated at reflux temperature (about 103° C.) for a period of about 16 hours. After cooling to room temperature, the product was collected on a Buchner funnel and successively washed with portions about 400 to 500 milliliters of cold water until acid free to dark Congo indicator. The wet cake was dried in a vacuum oven at 55–60° C. for about 24 hours. 136 grams of crude 1,4-naphthalenediol were obtained as light gray to purplish gray crystals, melting at 185–186° C. representing a yield 95.7% of theory.

Example II

To a hot 20% solution of sulfuric acid (100 grams of sulfuric acid and 400 grams of water) were charged 50 grams of 4-amino-1-naphthol sulfate and the mass refluxed and agitated for 5 hours. The batch was cooled to 5° C. and filtered. A reddish brown crystalline wet cake was obtained which weighed 62.5 grams and melted at 184–186° C. The cake was recrystallized from 750 grams of boiling water yielding 25 grams of purified 1,4-naphthalenediol melting at 189–192° C.

Refluxing samples of 4-amino-1-naphthol sulfate in aqueous sulfuric acid solutions of 10% and 15%, respectively, for periods of up to about 40 hours showed that the rate of hydrolysis was higher in the 15% aqueous acid, that preferred reflux time was in the range of 13 to 18 hours and that prolonging the reflux time over 18 hours resulted in a product of lower melting point, thus indicating decomposition of the product.

We claim:

1. A process for the production of 1,4-naphthalenediol which comprises heating 4-amino-1-naphthol in the presence of an aqueous acid at a temperature of at least about 80° C. for sufficient length of time to convert the 4-amino-1-naphthol to 1,4-naphthalenediol.

2. A process for the production of 1,4-naphthalenediol as specified in claim 1 wherein said aqueous acid is 10 to 20% by weight aqueous sulfuric acid.

3. A process for the production of 1,4-naphthalenediol as specified in claim 1 wherein the temperature is in the range from about 80° C. to reflux temperature and the time is for a period of from about 4 to 24 hours.

4. A process for the production of 1,4-naphthalenediol as specified in claim 3 wherein the aqueous acid is from about 10 to 20% by weight aqueous sulfuric acid and the time is for a period of from about 13 to 18 hours.

5. A process for the production of 1,4-naphthalenediol as specified in claim 4 wherein the 4-amino-1-naphthol is added to the reaction mass in the form of 4-amino-1-naphthol sulfate.

6. A process for the production of 1,4-naphthalenediol as specified in claim 4 wherein the 4-amino-1-naphthol is added to the reaction mass in the form of 4-amino-1-naphthol hydrochloride.

7. A process for the production of 1,4-naphthalenediol which comprises heating 4-amino-1-naphthol in the presence of an aqueous acid at a temperature of at least about 80° C. for sufficient time to convert the 4-amino-1-naphthol to 1,4-naphthalenediol, said acid being preesnt in an amount sufficient to provide 1 to 16 equivalents of acid per equivalent of 4-amino-1-naphthol.

References Cited

Fieser and Fieser, Organic Chemistry, N.Y., Reinhold Publishing Corp., 1956, page 741.

PB Report 77720 (B.I.O.S. Final Report No. 1143), pages 1–2, 17–20 (1946).

LEON ZITVER, *Primary Examiner.*

H. ROBERTS, *Assistant Examiner.*